No. 711,074. Patented Oct. 14, 1902.
P. F. RENAUD & W. P. CAREY.
STREET SWEEPER AND DIRT CONVEYER.
(Application filed Jan. 25, 1902.)
(No Model.) 3 Sheets—Sheet 1.
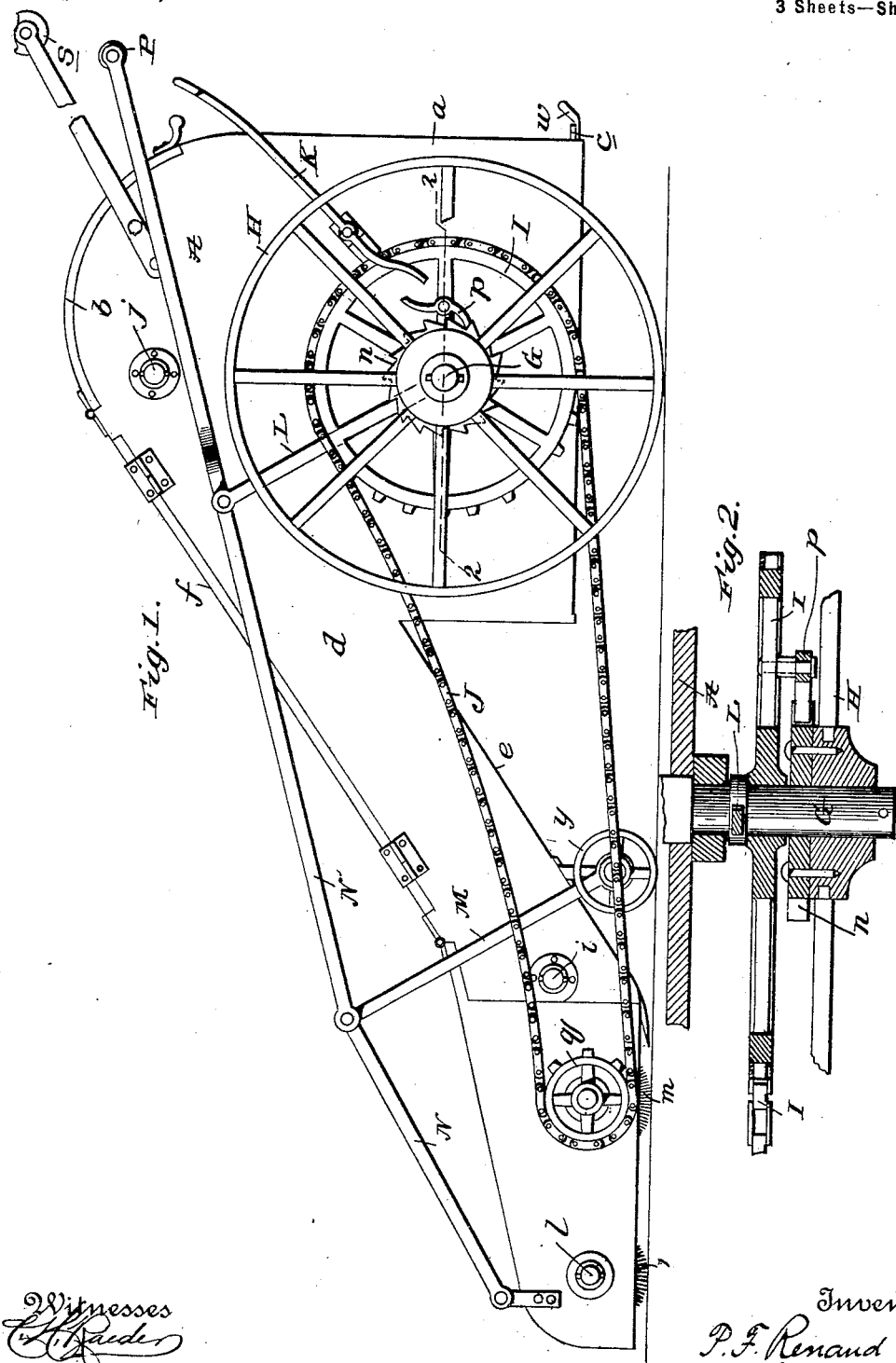

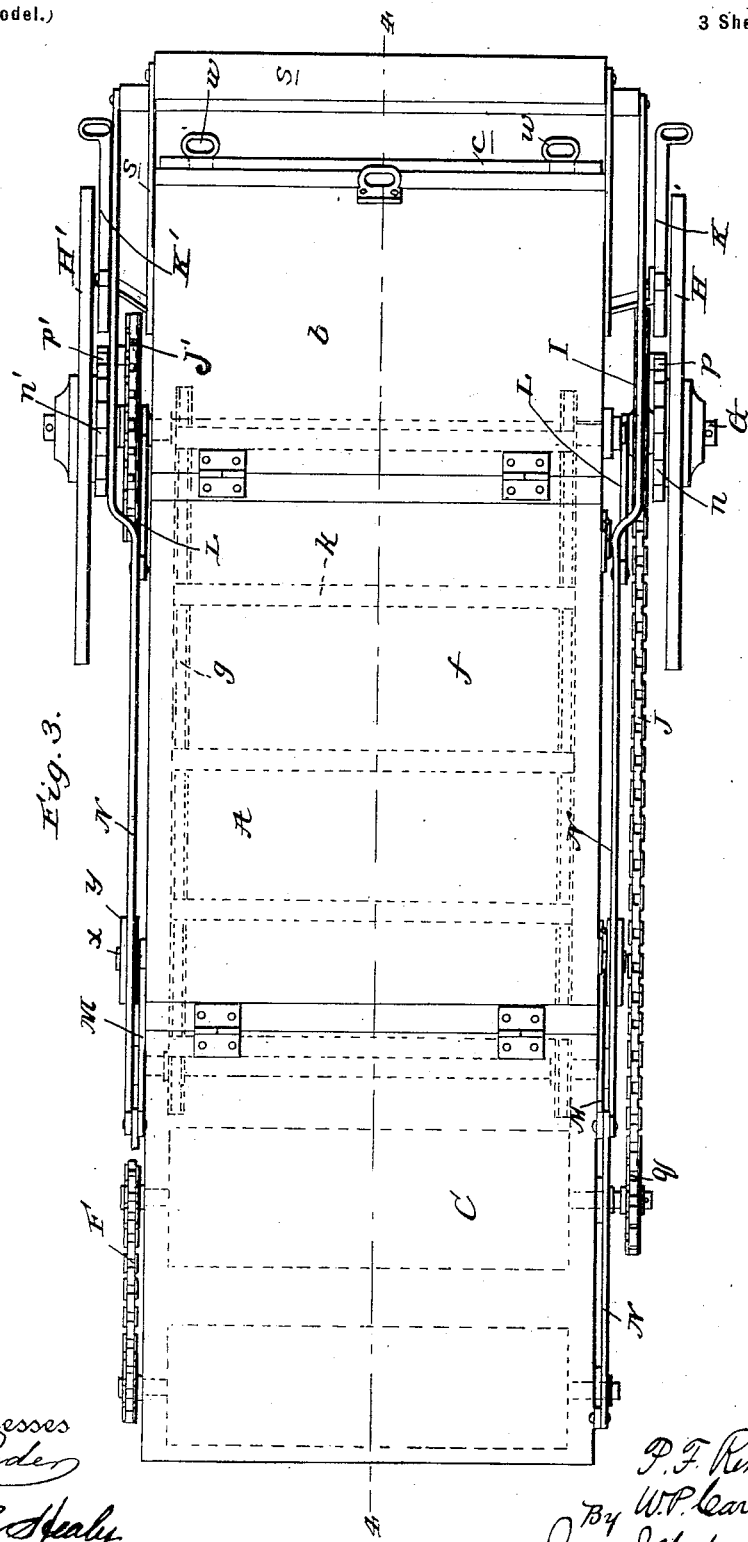

No. 711,074. Patented Oct. 14, 1902.
P. F. RENAUD & W. P. CAREY.
STREET SWEEPER AND DIRT CONVEYER.
(Application filed Jan. 25, 1902.)
(No Model.) 3 Sheets—Sheet 3.
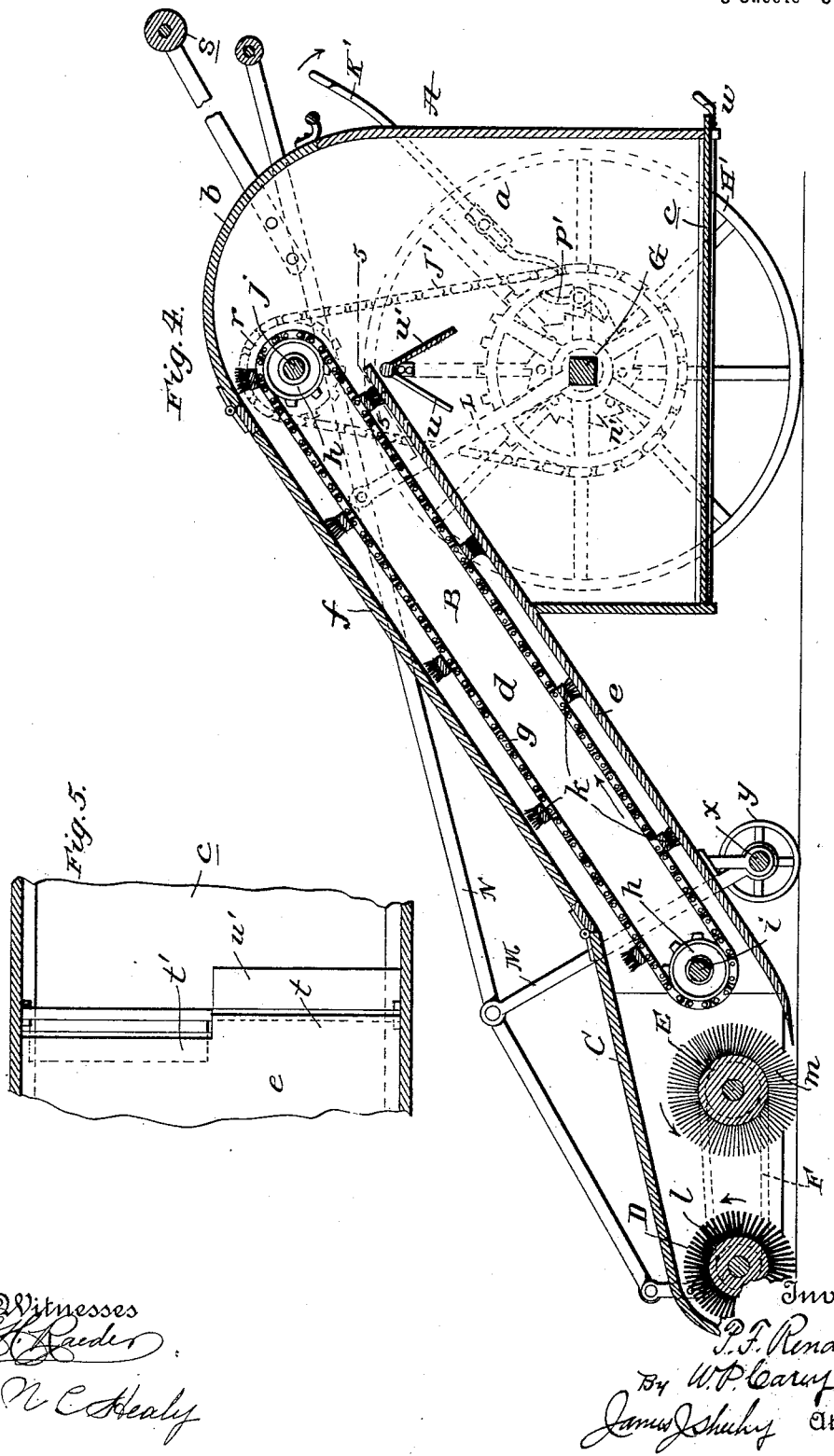
Witnesses
C. H. Raeder
N. C. Healy
Inventors
P. F. Renaud &
By W. P. Carey
James J. Shuhy Attorney
THE NORRIS PETERS CO., PHOTO-LITHO., WASHINGTON, D. C.

UNITED STATES PATENT OFFICE.

PAUL F. RENAUD AND WILLIAM P. CAREY, OF NEW ORLEANS, LOUISIANA.

STREET-SWEEPER AND DIRT-CONVEYER.

SPECIFICATION forming part of Letters Patent No. 711,074, dated October 14, 1902.

Application filed January 25, 1902. Serial No. 91,249. (No model.)

*To all whom it may concern:*

Be it known that we, PAUL F. RENAUD and WILLIAM P. CAREY, citizens of the United States, residing at New Orleans, in the parish of Orleans and State of Louisiana, have invented new and useful Improvements in Street-Sweepers and Dirt-Conveyers, of which the following is a specification.

Our invention relates to improvements in that class of street-sweepers and dirt-conveyers which are adapted to collect the sweepings; and it consists in the peculiar and advantageous sweeper hereinafter described, and particularly pointed out in the claims appended.

In the accompanying drawings, Figure 1 is a side elevation of our improved sweeper; Fig. 2, an enlarged detail section taken in the plane indicated by the line 2 2 of Fig. 1 and illustrating a portion of the gearing for transmitting motion from one traveling wheel to the brushes; Fig. 3, a plan of the sweeper; Fig. 4, a longitudinal central section taken in the plane indicated by the line 4 4 of Fig. 3, and Fig. 5 a detail section taken in the plane indicated by the line 5 5 of Fig. 4 looking downwardly and illustrating the relative arrangement of the upper end of the bottom wall of the conduit and the deflectors.

Similar letters of reference designate corresponding parts in all the views of the drawings, referring to which—

A is the casing and main frame of the machine, which in the preferred embodiment of the invention comprises a sweepings-receptacle $a$, having a hinged top $b$ and a slidable bottom $c$, and a forwardly and downwardly inclined conduit $d$, having a bottom wall $e$ extending from within the receptacle $a$ to a point adjacent to the ground and also having a hinged top $f$.

B is an endless conveyer arranged in the conduit $d$ and preferably made up of sprocket-chains $g$, which take around sprocket-wheels $h$ on lower and upper transverse shafts $i\ j$, journaled in the side walls of the casing, and cross-bars $k$, connected to the chains $g$ at suitable intervals and provided with bristles.

C is a hood connected in a hinged manner to the forward end of the top wall of conduit $d$ and adapted to be swung upwardly; D, a rotary brush interposed between and journaled in the side walls of the hood and having coarse bristles $l$, such as are calculated to break up or disintegrate caked substance on the street; E, a rotary brush journaled in the hood C in rear of the brush D and having comparatively fine or soft bristles $m$ whereby it is adapted to sweep the refuse upon the lower portion of the inclined conduit-wall $e$; F, a sprocket-chain connecting sprocket-wheels on the shafts of the brushes D E and having for its purpose to transmit motion from the brush E to the brush D; G, a transverse shaft journaled in the side walls of the receptacle $a$; H H', traveling wheels carried by the shaft G and having ratchet-disks $n\ n'$ fixed to their inner sides; I I', sprocket-wheels loosely mounted on the shaft G adjacent to the traveling wheels H H', respectively, and equipped with pawls $p\ p'$, arranged to normally engage the disks $n\ n'$; J, a sprocket-chain connecting the sprocket-wheel I and a sprocket-wheel $q$ on the shaft of the brush E, and J', Fig. 4, a sprocket-chain connecting the sprocket-wheel I' and a sprocket-wheel $r$ on the shaft $j$.

By virtue of the construction so far described it will be readily observed that when the machine is pushed forwardly by the operator, who grasps the handle $s$, the brushes D E will be rotated and the endless conveyer B driven in the direction indicated by arrows in Fig. 1, with the result that the brush D will break up caked or other hard substance on the street, the brush E will sweep the dirt and other refuse on the lower portion of the conduit-wall $e$, and the conveyer B will convey the dirt or other refuse upwardly in the conduit and discharge the same into the receptacle $a$. It will also be observed that when the pawl $p$, adjacent to sprocket-wheel I is disengaged from its complementary ratchet-disk $n$ the brushes D E will be rendered idle notwithstanding the movement of the machine, while when the pawl $p'$, adjacent to the sprocket-wheel I', is disengaged from its complementary ratchet-disk $n'$ the endless conveyer B will be rendered idle. For the purpose of disengaging the pawls $p\ p'$ from the ratchets n n' we prefer to employ the levers K K', fulcrumed on the side walls of the receptacle a in such manner that they will be held by friction in the positions in which they are placed. When the said levers are in the position shown, they obviously will not interfere with the rotation of the sprocket-wheels bearing the pawls; but when they are rocked in the direction indicated by arrows in Figs. 1 and 4 subsequent to the pawls assuming the positions shown in said figures their inner arms will disengage the pawls from the ratchets and retain said pawls in their disengaged position. When the levers K K' are disengaged from the pawls, the latter will gravitate into engagement with the ratchet-disks and reëstablish the connection between the traveling wheels and the brushes and conveyer.

In order to distribute the sweepings discharged into the receptacle a over the slidable bottom c thereof, we extend one longitudinal half t of the conduit-wall e rearwardly beyond the other longitudinal half t' thereof, Fig. 5, and provide the oppositely-disposed deflectors u u', Fig. 4. The deflector u is disposed below the end of the wall portion t and has for its purpose to guide the sweepings discharged from said portion to the rear part of the receptacle a, while the deflector u' is disposed below the end of the wall portion t' and is designed to guide the sweepings discharged by said portion to the rear part of the receptacle a. The bottom c of said receptacle is slidable, as stated, in order that it may be withdrawn rearwardly through the medium of its handles w when it is desired to discharge the sweepings from the receptacle.

L L are arms mounted and adapted to swing in the shaft G; M M, similar arms mounted on a transverse shaft x, disposed below and connected to the conduit d, and N N links connected to the arms L and M, the hood C, and a transverse handle P. By virtue of this construction it will be observed that when it is desired to move the machine over a crossing or from one point to another point at a distance the operator is enabled to conveniently raise the hood C and hold the same raised, with the brushes D E away from the street. The facility with which the hood and brushes may be raised is also advantageous when stones and other obstructions lie in the path of the sweeper, since it enables the operator to prevent the brushes being damaged.

We prefer to equip the shaft x with traveling wheels y, as shown, in order to support the forward portion of the conduit d, but do not desire to be understood as confining ourselves to the same, as the said wheels are not essential. The machine may also be equipped with means for attaching a draft animal or animals when desired without departing from the scope of our invention.

In using our improved machine the operator pushes the same over the street to be cleaned until the receptacle a is full of sweepings. He then raises the hood and the brushes through the medium of the mechanism described and pushes the machine to the point where the sweepings are to be deposited, at which point he draws the bottom slide c rearwardly and permits the sweepings to fall upon the ground. From this it will be appreciated that the sweeping of the street with the machine and the discharge of the collected sweepings from the machine requires but a minimum amount of effort.

We have entered into a detailed description of the construction and relative arrangement of all the parts embraced in the present and preferred embodiment of our invention in order to impart a full, clear, and exact understanding of the same. We do not desire, however, to be understood as confining ourselves to such specific construction and arrangement of parts, as such changes or modifications may be made in practice as fairly fall within the scope of our claims.

Having described our invention, what we claim, and desire to secure by Letters Patent, is—

1. In the street-sweeper and dirt-conveyer described, the combination of a casing mounted on wheels, and comprising a sweepings-receptacle, and a conduit communicating with and extending forwardly and downwardly from said receptacle, and having one longitudinal portion of its bottom wall extended rearwardly beyond the other longitudinal portion thereof, oppositely-inclined deflectors arranged in the receptacle of the casing below the rear ends of said longitudinal portions of the conduit-bottom, a rotary brush supported in advance of the forward end of the conduit-bottom, an endless conveyer arranged in the conduit, and suitable means for rotating the brush and driving the endless conveyer.

2. In the street-sweeper and dirt-conveyer described, the combination of a casing comprising a sweepings-receptacle, and a conduit communicating with and extending forwardly and downwardly from said receptacle, an endless conveyer arranged in the conduit, a hood connected in a hinged manner to the forward end of the conduit and arranged to swing upwardly, rotary brushes arranged one in front of the other in the hood and having coarse and fine bristles, respectively, gearing connecting the said brushes, a handle disposed adjacent to the receptacle of the casing, connections between said handle and the hood, a transverse shaft mounted in the receptacle of the casing and bearing traveling wheels, ratchet-disks connected to the wheels, a gear-wheel loose on the shaft, connected with the endless conveyer, and having a pawl adapted to engage the ratchet-disk of one traveling wheel, a gear-wheel loose on the shaft, connected with the rear brush, and having a pawl adapted to engage the ratchet-disk of the other traveling wheel, and levers fulcrumed on the receptacle of the casing and arranged to disengage the pawls from the ratchet-disks.

In testimony whereof we have hereunto set our hands in presence of two subscribing witnesses.

PAUL F. RENAUD.
     WILLIAM P. CAREY.

Witnesses:
 HENRY J. GASSIE,
 ROBT. MCDOWELL.